(12) United States Patent  
Shin

(10) Patent No.: US 8,953,411 B2
(45) Date of Patent: Feb. 10, 2015

(54) APPARATUS AND METHOD FOR IMAGING A SUBSURFACE USING FREQUENCY-DOMAIN ELASTIC REVERSE-TIME MIGRATION

(75) Inventor: Changsoo Shin, Seoul (KR)

(73) Assignee: SNU R&DB Foundation, Seoul (KR)

( * ) Notice: Subject to any disclaimer, the term of this patent is extended or adjusted under 35 U.S.C. 154(b) by 832 days.

(21) Appl. No.: 13/160,913

(22) Filed: Jun. 15, 2011

(65) Prior Publication Data

US 2012/0051182 A1    Mar. 1, 2012

(30) Foreign Application Priority Data

Aug. 24, 2010  (KR) .................. 10-2010-0082160

(51) Int. Cl.
*G01V 1/28* (2006.01)

(52) U.S. Cl.
CPC .............. *G01V 1/28* (2013.01); *G01V 2210/51* (2013.01); *G01V 2210/67* (2013.01)
USPC .......................................................... 367/59

(58) Field of Classification Search
CPC ............. G01V 1/28; G01V 1/30; G01V 3/38; G01V 1/282; G01V 2210/20; G01V 2210/21; G01V 2210/32; G01V 2210/40; G01V 2210/42; G01V 2210/45; G01V 2210/322; G01V 2210/3246; G06T 17/05; G06F 19/00; G06G 7/48; G03H 3/00
USPC ................ 73/625–626; 367/7, 9, 11, 15, 21, 367/31–38, 43–59, 62–63, 68, 73, 75, 130, 367/138; 181/111; 600/437–482; 702/14–17; 703/10
See application file for complete search history.

(56) References Cited

U.S. PATENT DOCUMENTS

| | | | | |
|---|---|---|---|---|
| 5,987,387 A | * | 11/1999 | Dickens et al. | 702/14 |
| 6,311,133 B1 | * | 10/2001 | Lailly et al. | 702/18 |
| 6,427,124 B1 | * | 7/2002 | Dubinsky et al. | 702/9 |
| 6,903,999 B2 | * | 6/2005 | Curtis et al. | 367/38 |
| 2003/0195705 A1 | * | 10/2003 | Leaney | 702/14 |
| 2005/0234319 A1 | * | 10/2005 | Mandelis et al. | 600/407 |
| 2006/0203613 A1 | * | 9/2006 | Thomsen et al. | 367/38 |
| 2007/0104028 A1 | * | 5/2007 | Van Manen et al. | 367/38 |
| 2008/0015783 A1 | * | 1/2008 | Robertsson et al. | 702/14 |
| 2008/0049551 A1 | * | 2/2008 | Muyzert et al. | 367/24 |
| 2008/0109168 A1 | * | 5/2008 | Koren et al. | 702/16 |

(Continued)

FOREIGN PATENT DOCUMENTS

| | | |
|---|---|---|
| GB | 2322747 A | 9/2008 |
| JP | 10-243306 A | 9/2011 |

(Continued)

*Primary Examiner* — Isam Alsomiri
*Assistant Examiner* — Amienatta M Ndure Jobe
(74) *Attorney, Agent, or Firm* — NSIP Law

(57) ABSTRACT

Provided are an apparatus and method for imaging a subsurface using frequency-domain reverse-time migration in elastic medium. The subsurface imaging method represents a frequency-domain imaging condition as convolution of measured data and a partial derivative wavefield. That is, the subsurface imaging method applies a back-propagation algorithm to represent an imaging condition as convolution of a virtual source and a back-propagated wavefield. Then, the subsurface imaging method divides a virtual source vector and the back-propagated wavefield represented by a displacement vector into P- and S-wave potentials through Helmholtz decomposition, thereby providing a new imaging condition.

4 Claims, 3 Drawing Sheets

(56) References Cited

U.S. PATENT DOCUMENTS

| | | | |
|---|---|---|---|
| 2008/0162051 A1* | 7/2008 | Ikelle | 702/14 |
| 2009/0043545 A1* | 2/2009 | van Manen et al. | 703/2 |
| 2009/0204330 A1* | 8/2009 | Thomsen et al. | 702/14 |
| 2009/0205899 A1* | 8/2009 | Geerits et al. | 181/106 |
| 2010/0002539 A1* | 1/2010 | Kragh et al. | 367/23 |
| 2010/0074049 A1* | 3/2010 | Kragh et al. | 367/16 |
| 2010/0118651 A1* | 5/2010 | Liu et al. | 367/50 |
| 2010/0250141 A1* | 9/2010 | Tompkins | 702/7 |
| 2010/0302909 A1* | 12/2010 | Muyzert et al. | 367/178 |
| 2011/0310699 A1* | 12/2011 | Robertsson et al. | 367/21 |
| 2012/0051179 A1* | 3/2012 | Shin | 367/50 |
| 2012/0051180 A1* | 3/2012 | Shin | 367/50 |
| 2012/0051182 A1* | 3/2012 | Shin | 367/59 |
| 2013/0088939 A1* | 4/2013 | Edme et al. | 367/43 |

FOREIGN PATENT DOCUMENTS

| | | |
|---|---|---|
| KR | 10-2004-0036072 A | 4/2004 |
| WO | WO 2012067958 A3 * | 8/2012 |

* cited by examiner

APPARATUS AND METHOD FOR IMAGING A SUBSURFACE USING FREQUENCY-DOMAIN ELASTIC REVERSE-TIME MIGRATION

CROSS-REFERENCE TO RELATED APPLICATION

This application claims the benefit under 35 U.S.C. §119 (a) of a Korean Patent Application No. 10-2010-0082160, filed on Aug. 24, 2010, the entire disclosure of which is incorporated herein by reference for all purposes.

BACKGROUND

1. Field

The following description relates to subsurface exploration, and more particularly, to an apparatus and method for imaging a subsurface using frequency-domain elastic reverse-time migration.

2. Description of the Related Art

Subsurface exploration has been used to discover the subsurface and geological characteristics of a specific region, and particularly, to find natural resources such as oil buried in the subsurface. With an increase in use amount of underground resources, subsurface exploration has been widely performed on sea, as well as on the earth surface. Subsurface exploration on the earth or sea plays an important role in finding fossil fuel, such as natural gas or oil, which is important energy sources, or in understanding a subsurface structure, detecting groundwater, etc.

A subsurface imaging technique is the most important part in subsurface exploration technology. Since acquisition of accurate subsurface images results in an accurate location selection for oil drilling, the subsurface imaging technique will contribute to a significant increase of the success probability of oilfield field development. Recently, due to an increase of demands for oil and gas resources and oil price hikes over the world, a concern to development of oil fields in deep sea bottoms and complicated topography, whose development has been delayed due to financing problems, is increasing. Since development of oil fields in deep sea bottoms and complicated topography requires higher costs compared to development of oil fields in sedimentary topography, a more improved subsurface imaging technique is needed.

Subsurface imaging techniques in acoustic medium have made a huge breakthrough. For example, in the subsurface imaging techniques in acoustic medium, various imaging techniques, such as an imaging technique based on the Kirchoff migration using a travel time curve, a subsurface imaging technique based beam migration, a subsurface imaging technique based on uni-directional or bi-directional wave equation, etc., have been proposed and developed. An imaging technique in acoustic medium is based on an imaging condition suggested by Professor Claerbout, which is a method of acquiring a location for imaging using a correlation between forward modeling data and backward modeling data.

A location for imaging of Acoustic medium can be relatively easily acquired since acoustic medium has only the P-wave component. However, since elastic medium has all of P, S and Rayleigh waves, it is not easy to obtain a location for imaging since undesired artifacts may be produced due to a correlation between the P, S and Rayleigh waves. In order to overcome the problem of elastic medium, studies into a method of applying the Helmholtz decomposition theorem to divide modeling data given as displacements into P- and S-wave potentials to thereby achieve imaging have been conducted. However, since the method is applied only to the time domain, and imaging of elastic medium requires a great deal of computer memory and computing time compared to acoustic medium, the method has difficulties in imaging wide regions.

SUMMARY

The following description relates to a technique of applying Helmholtz decomposition theorem in the frequency domain to subsurface imaging for elastic medium.

According to a subsurface imaging technique using frequency-domain elastic reverse-time migration, an imaging condition in the frequency domain may be expressed as convolution of measured data with a partial derivative wave field. For efficient computing, a back-propagation algorithm is applied to express the imaging condition as convolution of a virtual source with a back-propagation wavefield. In the subsurface imaging technique using frequency-domain elastic reverse-time migration, a new imaging condition is proposed by dividing both a back-propagated wavefield and a virtual source vector represented by a displacement vector into P- and S-wave potentials using the Helmholtz decomposition.

In one general aspect, there is provided an apparatus of imaging a subsurface, including: a plurality of receivers configured to receive a seismic data from a region to be observed; a signal processor configured to estimate sources wavelet from measured data measured by the receivers, and to process the seismic data so as to generate a migration image for imaging a subsurface of the region to be observed, wherein the signal processor generates migration images for a P-wave and a S-wave of the seismic data, by convolving a virtual source vector and a wavefield displacement vector obtained by back-propagating the seismic data, with a divergence operator and a curl operator.

Imaging conditions for generating the migration images for the P-wave and the S-wave are represented as equations E-1 and E-2, respectively:

$$(\phi_k)_{PP} = \int \mathrm{Re}\{\nabla \cdot [(v_{ke})_P{}^T]\nabla \cdot [S_e^{-1}\tilde{d}_e{}^*]\}d\omega \quad (\text{E-1})$$

$$(\phi_k)_{SS} = \int \mathrm{Re}\{\nabla \times [(v_{ke})^T]\nabla \times [S_e^{-1}\tilde{d}_e{}^*]\}d\omega \quad (\text{E-2})$$

where $(\phi_k)_{PP}$ is the imaging condition for P wave, $(\phi_k)_{SS}$ is the imaging condition for S wave, $(V_{ke})_p$, $(v_{ke})_s$ is the virtual source vector for the P and S wave velocity for the kth model parameter respectively, $\tilde{d}_e$ is the observed data, Re is the real part of the complex number, $\nabla\cdot$ is divergence operator, $\nabla\times$ is curl operator, T is transpose, * is complex conjugate, $\omega$ is angular frequency, and $S_e^{-1}$ is the inverse matrix of the complex impedance matrix in an elastic medium.

The virtual source vector is defined as equations (E-3) and (E-4) for the P-wave and the S-wave, respectively:

$$(v_{ke})_p = -\frac{\partial S_e}{\partial v_p}\tilde{u}_e \quad (\text{E-3})$$

$$(v_{ke})_s = -\frac{\partial S_e}{\partial v_s}\tilde{u}_e \quad (\text{E-4})$$

where $$\frac{\partial S_e}{\partial v_p} = 2\rho v_p \frac{\partial S_e}{\partial \lambda}, \quad \frac{\partial S_e}{\partial v_s} = -4\rho v_s \frac{\partial S_e}{\partial \lambda} + 2\rho v_s \frac{\partial S_e}{\partial \mu},$$

$\lambda$ is the damping factor for stability, $v_p$, $v_s$ are the P and S wave velocity respectively, $\tilde{u}_e$ is the modeled data, and $S_e$ is the complex impedance matrix in an elastic medium, $\mu$ is the Lame's constant, and $\rho$ is density.

The signal processor generates final migration images using equations (E-5) and (E-6):

$$(\phi_k)_{pp} = \\ NRM\left[\int NRM\left[\frac{\text{Re}\{\nabla \cdot [(v_{ke})^T]\nabla \cdot [S_e^{-1}\tilde{d}_e^*]\}}{\text{Re}\{\text{diag}[(\nabla \cdot [(v_{ke})^T])^T(\nabla \cdot [(v_{ke})^T])] + \lambda I\}}\right]d\omega\right] \quad \text{(E-5)}$$

and $$(\phi_k)_{ss} = \\ NRM\left[\int NRM\left[\frac{\text{Re}\{\nabla \times [(v_{ke})^T]\nabla \times [S_e^{-1}\tilde{d}_e^*]\}}{\text{Re}\{\text{diag}[(\nabla \times [(v_{ke})^T])^T(\nabla \times [(v_{ke})^T])] + \lambda I\}}\right]d\omega\right] \quad \text{(E-6)}$$

where NRM is the normalization operator, diag is the diagonal component of the matrix, and I is the identity matrix.

Therefore, according to the subsurface imaging technique using frequency-domain elastic reverse-time migration, by applying Helmholtz decomposition to the frequency domain for division into P- and S-wave potentials, a complex topographical structure in elastic medium having all of P, S and Rayleigh waves may be accurately investigated. Moreover, since use of the back-propagation algorithm eliminates a need for computing partial derivative wavefields, efficient computing is achieved.

Other features and aspects will be apparent from the following detailed description, the drawings, and the claims.

Figure 1:
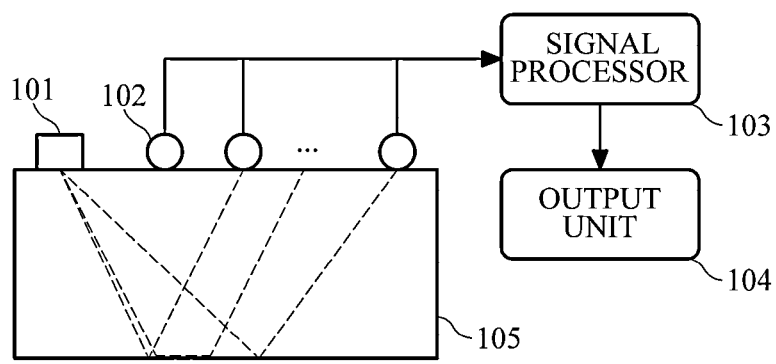
FIG. 1 is a diagram illustrating an example of a subsurface imaging apparatus using frequency-domain reverse-time migration in elastic medium.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a diagram illustrating an example of a subsurface imaging apparatus using frequency-domain reverse-time migration in elastic medium. Referring to FIG. 1, the subsurface imaging apparatus may include a source 101, a receiver 102, a signal processor 103, and an output unit 104.

The source 101 is used to generate waves (source wavelets) toward a region 105 to be observed. The kind of the source 101 is not limited, and may be a dynamite, an electric vibrator, etc. The source 101 may use well-known waves or arbitrary waves generated by a specific apparatus. For example, surface exploration generally uses waves generated by vibroseis, without knowing accurate information about the waveforms of used sources. In this case, it is needed to estimate sources when obtaining reverse-time migration images.

The receiver 102 detects seismic signals propagated from the region 105 to be observed, and the kind of the receiver 102 is also not limited. For example, the receiver 102 may be a seismic detector, or the like. For efficient detection of seismic, a plurality of receivers 102 may be disposed in a predetermined pattern (for example, in a lattice pattern) on or around the region 105. The output unit 104 is used to output signals (for example, migrated images) received from the signal processor 103, and may be a display that outputs images or graphic data.

The signal processor 103 may be a signal processor or a computer program to generate a migration images showing the subsurface of the region 105 using a virtual source vector and the seismic data (the measured data) received from the receiver 102. The source vector may be estimated using the received seismic data by the signal processor 103 based on predetermined model conditions, and a method of estimating the source wavelet is not limited. The migration image signal generated by the signal processor 103 is transferred to the output unit 104 and then output. The signal processor 103 may use the measured data and the virtual source vector to generate a migrated image with respect to P- and/or S-wave, representing the subsurface of the region 105, using conditions for imaging seismic, which will be described later.

According to the current example, the signal processor 103 processes signals in the frequency domain, not in the time domain. For example, the signal processor 103 transforms equation representing a migrated image in the time domain to equation representing a migrated image in the frequency domain, and then applies Helmholtz decomposition to horizontal and vertical displacements of seismic to divide into the P- and S-wave potentials, in consideration of the fact that virtual source signals and back-propagated waves all contain P, S and Rayleigh waves in elastic medium. Hereinafter, signal processing by the signal processor 103 will be described in more detail.

Imaging Conditions for Acoustic Waves

A migration image with respect to arbitrary model parameters in the time domain may be expressed as equation 1, below. According to equation 1, an imaging condition in the time domain is expressed as a zero-lag cross-correlation between an arbitrary parameter wavefield and measured data on receivers in the time domain.

$$\phi_k = \int \left[\frac{\partial u(t)}{\partial p_k}\right]^T d(t)dt, \quad (1)$$

where $\phi_k$ denotes the migration image for the k-th model parameter, $p_k$ denotes the k-th model parameter, T denotes the prefix of the matrix, and u(t) and d(t) denote the frequency-domain modeled wavefield and the measured wavefield, respectively. By transforming equation 1 to equation in the frequency domain, the reverse-time migration image can be expressed by convolution of the conjugate of the real measured data with the partial derivative wavefield. The migration image may be induced as:

$$\phi_k = \int \text{Re}\left\{\left[\frac{\partial \tilde{u}}{\partial p_k}\right]^T \tilde{d}^*\right\}d\omega, \quad (2)$$

where $\omega$ is the angular frequency, the superscript * denotes the complex conjugate, and $\tilde{u}$ and $\tilde{d}$ are the frequency-domain modeled wavefield and the measured wavefield, respectively. Meanwhile, it has been well-known that a frequency-domain wave equation can generally be expressed as a matrix like equation 3, below.

$$S\tilde{u}=\tilde{f} \quad (3)$$

where S is the complex impedance matrix, and $\tilde{f}$ is the frequency-domain source vector. By taking the partial derivative of both sides of equation 3 with respect to the k-th model parameter, equation 4 can be obtained as:

$$S\frac{\partial \tilde{u}}{\partial p_k} = -\frac{\partial S}{\partial p_k}\tilde{u} \text{ or } \frac{\partial \tilde{u}}{\partial p_k} = S^{-1}v_k, \quad (4)$$

where $$v_k\left(v_k = -\frac{\partial S}{\partial p_k}\tilde{u}\right)$$

is the k-th virtual source vector, and $S^{-1}$ is the inverse matrix of the complex impedance matrix.

By putting equation 4 into equation 2, equation 2 can be rewritten to equation 5 below:

$$\phi_k = \int \{(v_k)^T S^{-1} \tilde{d}\} d\omega \quad (5)$$

It can be seen from equation 5 that an imaging condition for acoustic medium can be defined in the frequency domain by convolving the virtual source vector with a wavefield $S^{-1}\tilde{d}$ obtained by back-propagating the measured data.

Imaging Conditions for Elastic Waves

2-D seismic wave equation can be defined as equations 6 and 7 below:

$$\rho\frac{\partial u}{\partial t^2} = \frac{\partial \sigma_{xx}}{\partial x} + \frac{\partial \sigma_{xz}}{\partial z} \text{ and} \quad (6)$$

$$\rho\frac{\partial v}{\partial t^2} = \frac{\partial \sigma_{zx}}{\partial x} + \frac{\partial \sigma_{zz}}{\partial z}, \quad (7)$$

where u and v denote horizontal and vertical displacements, respectively, and $\sigma_{xx}$, $\sigma_{xz}$, $\sigma_{zz}$ denote stresses in the xx, xz, and zz directions, respectively.

The stress equations in the xx, xz, and zz directions can be defined as equations 8, 9, and 10, respectively.

$$\sigma_{xx} = (\lambda+2\mu)\epsilon_{xx} + \lambda\epsilon_{zz} = (\lambda+2\mu)\frac{\partial u}{\partial x} + \lambda\frac{\partial v}{\partial z}, \quad (8)$$

$$\sigma_{xz} = \mu\epsilon_{xz} = \mu\left(\frac{\partial v}{\partial x} + \frac{\partial u}{\partial z}\right) = \mu\epsilon_{zx} = \sigma_{zx}, \text{ and} \quad (9)$$

$$\sigma_{zz} = \lambda\epsilon_{xx} + (\lambda+2\mu)\epsilon_{zz} = \lambda\frac{\partial u}{\partial x} + (\lambda+2\mu)\frac{\partial v}{\partial z} \quad (10)$$

where $\rho$ is the density of medium, $\lambda$ and $\mu$ are the Lame's constants, u and v are the horizontal and vertical displacements, respectively, $\epsilon_{xx}$, $\epsilon_{xz}$, and $\epsilon_{zz}$ are strains in the xx, xz, and zz directions, and $\sigma_{xx}$, $\sigma_{xz}$, $\sigma_{zz}$ are stresses in the xx, xz, and zz directions, respectively.

By putting the stress equations defined by equations 8, 9, and 10 into equations 6 and 7 and then performing Fourier transformation, equations 11 and 12 are deduced.

$$-\rho\omega^2\tilde{u} - \frac{\partial}{\partial x}\left\{(\lambda+2\mu)\frac{\partial \tilde{u}}{\partial x} + \lambda\frac{\partial \tilde{v}}{\partial z}\right\} - \frac{\partial}{\partial z}\left\{\mu\left(\frac{\partial \tilde{v}}{\partial x} + \frac{\partial \tilde{u}}{\partial z}\right)\right\} = 0, \quad (11)$$

and $$-\rho\omega^2\tilde{v} - \frac{\partial}{\partial x}\left\{\mu\left(\frac{\partial \tilde{v}}{\partial x} + \lambda\frac{\partial \tilde{u}}{\partial z}\right)\right\} - \frac{\partial}{\partial z}\left\{\lambda\frac{\partial \tilde{u}}{\partial x} + (\lambda+2\mu)\frac{\partial \tilde{v}}{\partial z}\right\} = 0, \quad (12)$$

where $\tilde{u}$ and $\tilde{v}$ denotes horizontal and vertical displacements in the frequency domain, respectively.

Meanwhile, modeling of seismic wave equation in the frequency domain also can be expressed, like acoustic wave equation, as a matrix such as equation 13.

$$S_e\tilde{u}_e=\tilde{f}_e, \quad (13)$$

where $S_e$ represents the complex impedance matrix of seismic wave equation, $\tilde{u}_e$ is the horizontal and vertical displacement vector in the frequency domain, and $\tilde{f}_e$ is the horizontal and vertical source vector in the frequency domain.

Since modeling of seismic wave equation in the frequency domain can be expressed as a matrix like equation 13, a reverse-time migration image in elastic medium can be represented as equation 14.

$$\phi_k = \int \text{Re}\{(v_{ke})^T S^{-1} \tilde{d}_e^*\} d\omega, \quad (14)$$

where $v_{ke}\left(v_{ke} = -\frac{\partial S_e}{\partial p_k}\tilde{u}_e\right)$ is the virtual source vector in elastic medium, and $\tilde{d}_e$ is the horizontal and vertical displacement vector measured in elastic medium.

It can be seen from equation 14 that a reverse-time migration image in elastic medium can be represented as convolution of the vertical source vector with the back-propagated wavefield, like equation 5 (reverse-time migration image in acoustic medium). However, unlike acoustic medium, in elastic medium, both the vertical source vector and the back-propagated wavefield contain all of P, S, and Rayleigh waves. When convolution is performed on seismic waves into which various kinds of waves are mixed, undesired artifacts may be generated, and as a result, it is difficult to obtain a clean subsurface image.

In 1990, Dellinger and Etgen suggested a method of dividing the seismic horizontal and vertical displacements into P- and S-wave potentials using divergence ($\nabla \cdot$) and curl ($\nabla \times$) operators. Thereafter, in 2008, Yan and Sava applied the method to the time domain to divide a seismic displacement vector into the potential of each displacement. According to Yan and Sava, an imaging condition in the time domain can be expressed as equation 15, below:

$$I_{ij}(x)=\int a_{si}(x,t)a_{ri}(x,t)dt \quad (15)$$

where $a_i$ and $a_j$ denote the divided P- and S-wave potentials. According to equation 15, four migration images of $I_{pp}$, $I_{ps}$, $I_{sp}$, and $I_{ss}$ can be obtained.

According to an example, based on the fact that an imaging condition in the frequency domain is represented as convolution of a virtual source vector with a wavefield obtained by back-propagating measured data, by applying the divergence and curl operators to the virtual source vector and the back-propagated wavefield displacement vector, imaging conditions similar to $I_{pp}$ and $I_{ss}$ obtained from equation 15 are induced, which can be written as equations 16 and 17, below.

$$(\phi_k)_{PP} = \int Re\{\nabla \cdot [(v_{ke})^T]\nabla \cdot [S_e^{-1}\tilde{d}_e^*]\} d\omega \tag{16}$$

$$(\phi_k)_{SS} = \int Re\{\nabla \times [(v_{ke})^T]\nabla \times [S_e^{-1}\tilde{d}_e^*]\} d\omega \tag{17}$$

Model Parameters

The current example considers the fact that elastic medium, unlike acoustic medium, includes various model parameters. A migration image in elastic medium may depend on various model parameters. Upon actual migration, a virtual source vector in elastic medium may be obtained by differentiating a complex impedance matrix with respect to individual model parameters. A complex impedance matrix that is used upon modeling of a seismic wave equation is composed of the Lame's constant and density. However, the subsurface imaging method according to the current example uses P- and S-wave velocities as interested model parameters. Like the Mora's method (1987), the subsurface imaging method according to the current example may use a chain rule to generate a virtual source vector.

A correlation between P- and S-waves, the Lame's constant, and density can be represented as equations 18 and 19, below.

$$\lambda = \rho V_p^2 - 2\rho V_s^2 \tag{18}$$

$$\mu = \rho V_s^2 \tag{19}$$

Derivatives of complex impedance for the P- and S-wave velocities can be defined using equations 18 and 19 and the chain rule, as follows. Accordingly, virtual source vectors for the P- and S-wave velocities can be defined as equations 20 and 21.

$$(v_{ke})_p = -\frac{\partial S_e}{\partial v_p}\tilde{u}_e, \text{ and} \tag{20}$$

$$(v_{ke})_s = -\frac{\partial S_e}{\partial v_s}\tilde{u}_e, \tag{21}$$

where $$\frac{\partial S_e}{\partial v_p} = 2\rho v_p \frac{\partial S_e}{\partial \lambda}, \text{ and } \frac{\partial S_e}{\partial v_s} = -4\rho v_s \frac{\partial S_e}{\partial \lambda} + 2\rho v_s \frac{\partial S_e}{\partial \mu}.$$

Scaling

In a general migration condition for acoustic medium, a migration image is scaled with an autocorrelation of a modeled wavefield at a source location, so that the amplitude of the migration image is corrected.

As described above, the virtual source vector used in the current example means a modeled wavefield at a source location in the general migration condition. Therefore, according to the current example, a pseudo-Hessian matrix is created like the conventional method, and the migration image may be scaled using the diagonal of the pseudo-Hessian matrix.

Also, normalization may be performed such that migration images obtained for individual frequencies have the same weight, and then the normalized image is again normalized, thereby obtaining a final migration image. The final migration image is represented with is respect to P- and S-waves as equations 22 and 23, which are called a PP method and a SS method.

$$(\phi_k)_{pp} = \tag{22}$$
$$NRM\left[\int NRM\left[\frac{Re\{\nabla \cdot [(v_{ke})^T]\nabla \cdot [S_e^{-1}\tilde{d}_e^*]\}}{Re\{diag[(\nabla \cdot [(v_{ke})^T])^T(\nabla \cdot [(v_{ke})^T])] + \lambda I\}}\right]d\omega\right]$$

$$(\phi_k)_{ss} = \tag{23}$$
$$NRM\left[\int NRM\left[\frac{Re\{\nabla \times [(v_{ke})^T]\nabla \times [S_e^{-1}\tilde{d}_e^*]\}}{Re\{diag[(\nabla \times [(v_{ke})^T])^T(\nabla \times [(v_{ke})^T])] + \lambda I\}}\right]d\omega\right]$$

Simulation (Marmousi-2 Model)

In order to verify the reverse-time migration in elastic medium, the Marmousi-2 model was used to perform simulation. For imitating the accurate earth state, new P- and S-wave velocity models and a density model were designed by eliminating a water layer from the conventional Marmousi-2 model.

In order to create observed data about the Marmousi-2 model from which the water layer has been eliminated, the time-domain 2D cell-based FDM modeling algorithm has been used. In this case, vertical sources were placed at regular intervals of 20 m on the earth surface, and horizontal and vertical displacements have been measured on 1,101 receivers located at regular intervals of 10 m. The total measurement time was 6 seconds. Also, since the S-wave velocity of the Marmousi-2 velocity model had a region with a very low speed, a first-order derivative Gaussian function whose maximum frequency was 5 Hz has been used as a transmission waveform. In the simulation, migration images with respect to the P- and S-waves have been obtained using the conventional method and the P- and S-wave imaging methods according to the above-described examples, based on a slightly smoothed velocity model.

Figure 2A:
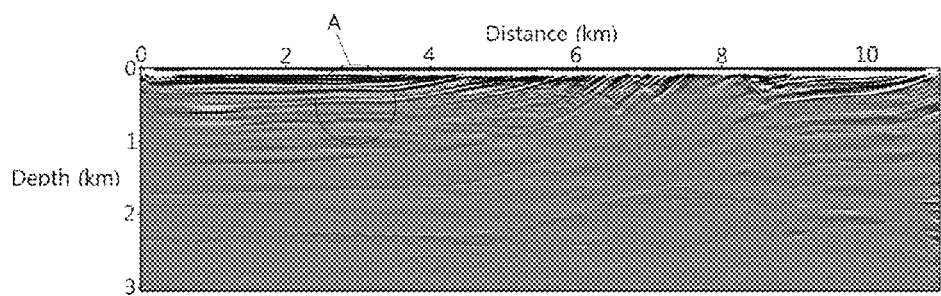
FIGS. 2A, 2B, and 2C show P-wave migration images obtained by a conventional method, by a PP method, and by a SS method, respectively.
Figure 2B:
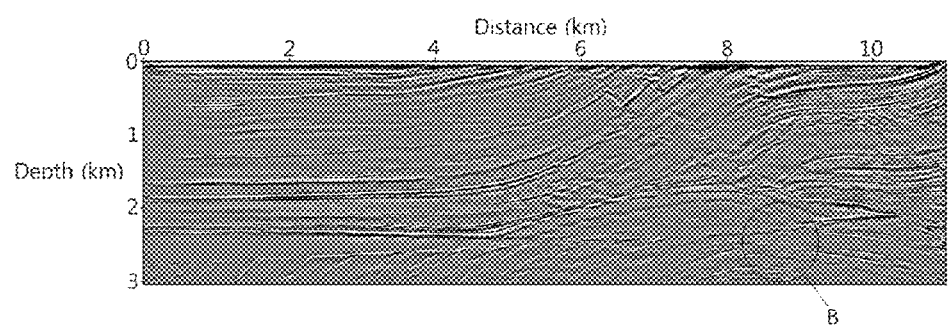
Figure 2C:
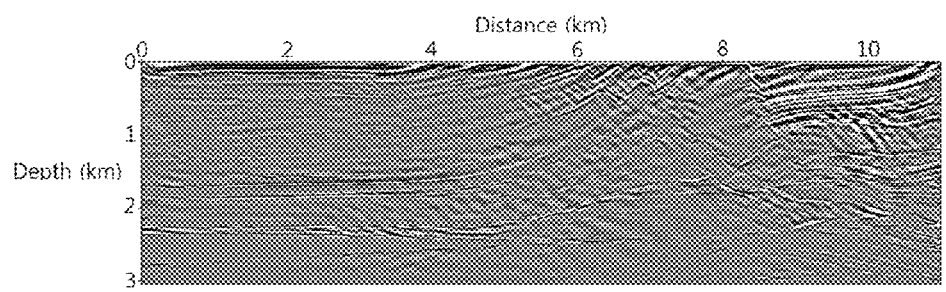

FIGS. 2A, 2B, and 2C show P-wave migration images obtained by the conventional method, by the PP method (see equation 22), and by the SS method (see equation 23), respectively.

Figure 3A:
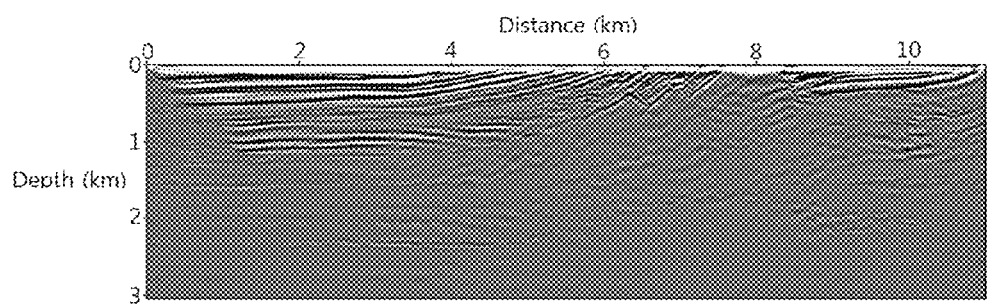
FIGS. 3A, 3B, and 3C show S-wave migration images obtained by the conventional method, by the PP method, and by the SS method, respectively.
Figure 3B:
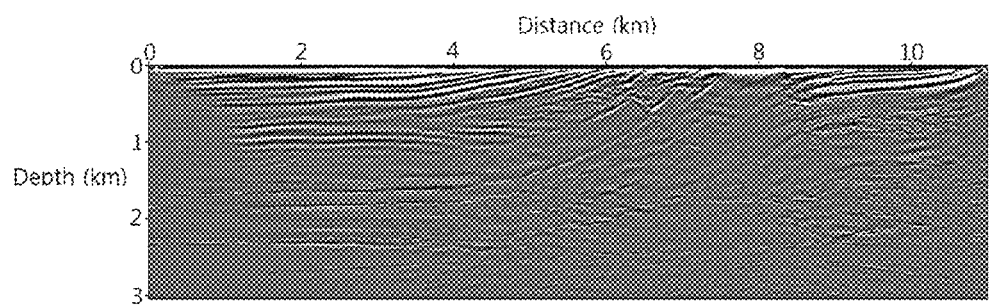
Figure 3C:
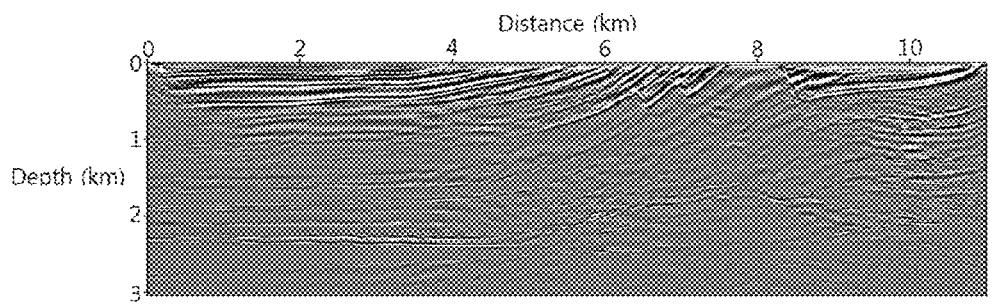

FIGS. 3A, 3B, and 3C show S-wave migration images obtained by the conventional method, by the PP method, and by the SS method, respectively. It can be seen from FIGS. 2A, 2B, 2C, 3A, 3B, and 3C that the migrated images obtained by the PP and SS methods provide more detailed information about a subsurface than the migration image obtained by the conventional method.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:
1. An apparatus of imaging a subsurface, comprising:
a plurality of receivers configured to receive a seismic data from a region to be observed;
a signal processor configured to estimate sources from measured data measured by the receivers, and to process the seismic data so as to generate a migration image signal for imaging a subsurface of the region to be observed, wherein:
the signal processor generates migration images for a P-wave and a S-wave of a seismic signal, by convolving a virtual source vector and a wavefield displacement vector obtained by back-propagating the seismic signal, with a divergence operator and a curl operator, and imaging conditions for generating the migration images for the P-wave and the S-wave are represented as equations E-1 and E-2, respectively:

$$(\phi_k)_{PP} = \int \mathrm{Re}\{\nabla \cdot [(v_{ke})^T] \nabla \cdot [S_e^{-1}\tilde{d}_e^*]\} d\omega \text{ and} \quad \text{(E-1)}$$

$$(\phi_k)_{SS} = \int \mathrm{Re}\{\nabla \times [(v_{ke})^T] \nabla \times [S_e^{-1}\tilde{d}_e^*]\} d\omega, \quad \text{(E-2)}$$

where $(\phi_k)_{PP}$ is the imaging condition for P wave, $(\phi_k)_{SS}$ is the imaging condition for S wave, $(v_{ke})_p$, $(v_{ke})_s$ is the virtual source vector for the P and S wave velocity for the kth model parameter respectively, $\tilde{d}_e$ is the observed data, Re is the real part of the complex number, $\nabla\cdot$ is divergence operator, $\nabla\times$ is curl operator, T is transpose, * is complex conjugate, $\omega$ is angular frequency, and $S_e^{-1}$ is the inverse matrix of the complex impedance matrix in an elastic medium.

2. The apparatus of claim 1, wherein the virtual source vector is defined as equations (E-3) and (E-4) for the P-wave and the S-wave, respectively:

$$(v_{ke})_p = -\frac{\partial S_e}{\partial v_p}\tilde{u}_e, \text{ and} \quad \text{(E-3)}$$

$$(v_{ke})_s = -\frac{\partial S_e}{\partial v_s}\tilde{u}_e, \quad \text{(E-4)}$$

where $$\frac{\partial S_e}{\partial v_p} = 2\rho v_p \frac{\partial S_e}{\partial \lambda}, \; \frac{\partial S_e}{\partial \lambda}, \; \frac{\partial S_e}{\partial v_s} - 4\rho v_s \frac{\partial S_e}{\partial \lambda} + 2\rho v_s \frac{\partial S_e}{\partial \mu},$$

$\lambda$ is the damping factor for stability, $v_p$, $v_s$ are the P and S wave velocity respectively, $\tilde{u}_e$ is the modeled data, and $S_e$ is the complex impedance matrix in an elastic medium, $\mu$ is the Lame's constant, and $\rho$ is density.

3. The apparatus of claim 2, wherein the signal processor generates final migration images using equations (E-5) and (E-6):

$$(\phi_k)_{PP} = NRM\left[\int NRM\left[\frac{\mathrm{Re}\{\nabla \cdot [(v_{ke})^T] \cdot \nabla \cdot [S_e^{-1}\tilde{d}_e^*]\}}{\mathrm{Re}\{\mathrm{diag}[(\nabla \cdot [(v_{ke})^T])^T(\nabla \cdot [(v_{ke})^T])] + \lambda I\}}\right]d\omega\right],$$

and $$(\phi_k)_{SS} = NRM\left[\int NRM\left[\frac{\mathrm{Re}\{\nabla \times [(v_{ke})^T] \nabla \times [S_e^{-1}\tilde{d}_e^*]\}}{\mathrm{Re}\{\mathrm{diag}[(\nabla \times [(v_{ke})^T])^T(\nabla \times [(v_{ke})^T])] + \lambda I\}}\right]d\omega\right].$$

where NRM is the normalization operator, diag is the diagonal component of the matrix, and I is the identity matrix.

4. A method of imaging a subsurface, comprising:

receiving a seismic data from a region to be observed;

estimating sources from data measured by the receivers, and processing the seismic data so as to generate a migration image for imaging a subsurface of the region to be observed, wherein:

the processing of the seismic data comprises generating migration images for a P-wave and a S-wave of a seismic signal, by convolving a virtual source vector and a wavefield displacement vector obtained by back-propagating the seismic signal, with a divergence operator and a curl operator, and imaging conditions for generating the migration images for the P-wave and the S-wave are represented as equations E-1 and E-2, respectively:

$$(\phi_k)_{PP} = \int \mathrm{Re}\{\nabla \cdot [(v_{ke})^T] \nabla \cdot [S_e^{-1}\tilde{d}_e^*]\} d\omega \text{ and} \quad \text{(E-1)}$$

$$(\phi_k)_{SS} = \int \mathrm{Re}\{\nabla \times [(v_{ke})^T] \nabla \times [S_e^{-1}\tilde{d}_e^*]\} d\omega, \quad \text{(E-2)}$$

where $(\phi_k)_{PP}$ is the imaging condition for P wave, $(\phi_k)_{SS}$ is the imaging condition for S wave, $(v_{ke})_p$, $(v_{ke})_s$ is the virtual source vector for the P and S wave velocity for the kth model parameter respectively, $\tilde{d}_e$ is the observed data, Re is the real part of the complex number, $\nabla\cdot$ is divergence operator, $\nabla\times$ is curl operator, T is transpose, * is complex conjugate, $\omega$ is angular frequency, and $S_e^{-1}$ is the inverse matrix of the complex impedance matrix in an elastic medium.

* * * * *